(12) United States Patent
Cancilla et al.

(10) Patent No.: US 10,510,192 B2
(45) Date of Patent: Dec. 17, 2019

(54) SYSTEM AND METHOD PERFORMING JOB MANAGEMENT

(71) Applicant: Robin Systems, Inc., San Jose, CA (US)

(72) Inventors: Robert S. Cancilla, Pleasanton, CA (US); Krishna Satyasai Yeddanapudi, Pleasanton, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 927 days.

(21) Appl. No.: 15/090,065

(22) Filed: Apr. 4, 2016

(65) Prior Publication Data

US 2016/0217626 A1 Jul. 28, 2016

Related U.S. Application Data

(63) Continuation of application No. 14/444,805, filed on Jul. 28, 2014, now abandoned.

(51) Int. Cl.
| | | |
|---|---|---|
| *G06T 19/20* | (2011.01) | |
| *G06F 9/46* | (2006.01) | |
| *G06Q 10/06* | (2012.01) | |
| *H04L 29/08* | (2006.01) | |

(52) U.S. Cl.
CPC ............... *G06T 19/20* (2013.01); *G06F 9/46* (2013.01); *G06Q 10/0639* (2013.01); *H04L 67/10* (2013.01)

(58) Field of Classification Search
CPC ........ G06T 19/20; G06F 9/46; G06Q 10/0639
USPC .......................................................... 345/419
See application file for complete search history.

(56) References Cited

U.S. PATENT DOCUMENTS

| | | | |
|---|---|---|---|
| 2005/0198576 A1* | 9/2005 | Childress | G06F 11/324 715/736 |
| 2011/0187709 A1* | 8/2011 | Lee | G06F 3/041 345/419 |

\* cited by examiner

*Primary Examiner* — Hai Tao Sun
(74) *Attorney, Agent, or Firm* — David R. Stevens; Stevens Law Group (57) ABSTRACT

A system provides systems and methods for visualizing a computational process. A portion of attributes of a computational process may be displayed on a face of a three-dimensional object. In response to rotation of the object by a user, a different face of the object may be displayed and a different portion of the attributes displayed thereon. Each object may represent a status of a computational cluster, specifically a set of jobs executing on the cluster. A cluster may be selected and the jobs represented by means of graphical indicators arranges on a time axis and a performance axis. The size of a graphical indicator may indicate an amount of processing time consume by the corresponding job. A color of the graphical indicator may indicate a status. A portion of the graphical indicator may be visually distinguished from a remaining portion to indicate a completion percentage of the job.

16 Claims, 9 Drawing Sheets

SYSTEM AND METHOD PERFORMING JOB MANAGEMENT

RELATED APPLICATIONS

This application is a continuation of U.S. application Ser. No. 14/444,805, filed Jul. 28, 2014, and entitled System and Method Performing Job Management, which is hereby incorporated herein by reference in its entirety.

BACKGROUND

Field of the Invention

This invention relates to systems and methods for job management in computer systems.

Background of the Invention

Computing applications continue to grow more and more complex. This is particularly true of "big data" applications that are designed to process very large data sets. For example, Hadoop implements a system for processing large data sets according to a map-update approach. Such systems may be implemented across multiple computer systems and across multiple clusters of computer systems.

It can be difficult to visualize both the design of such systems and the current state of operation of such a system. The systems and methods disclosed herein provide an improved approach for visualizing the status of a complex system including a plurality of jobs.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
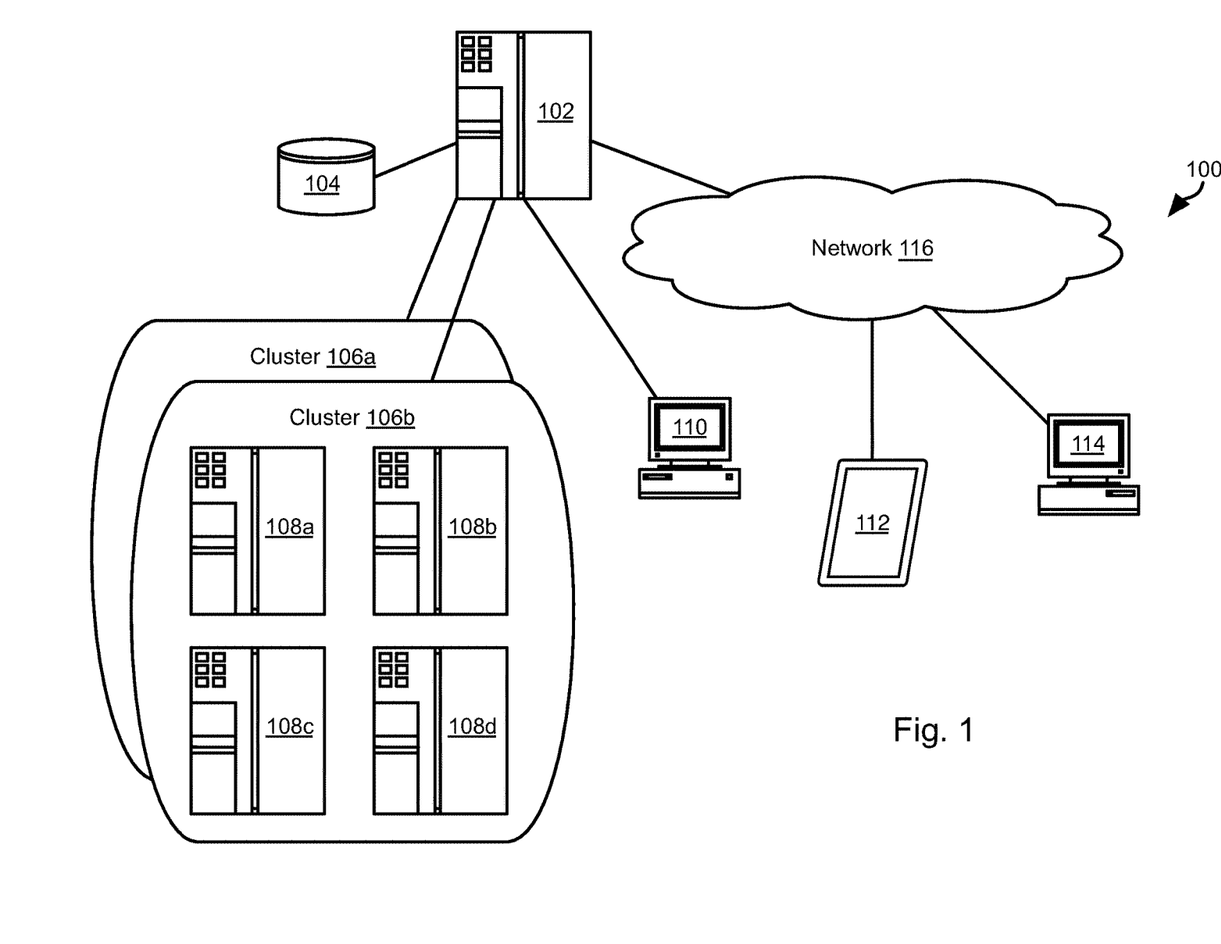
FIG. 1 is a schematic block diagram of a network environment suitable for implementing methods in accordance with embodiments of the invention.

Referring to FIG. 1, the systems and methods disclosed herein may be used to visualize the status of jobs executing on one or more computer systems, such as the illustrated network environment 100. For example, a server system 102 may be in data communication with one or more clusters 106a, 106b of computer systems. The server system 102 may also itself be a computer system of a cluster 106a, 106b. The server system 102 may collect data describing jobs executing on the one or more clusters 106a, 106b, such as in a database 104 of job data. The job data may include an execution status of each job (running, stopped, completed, failed, scheduled, and the like), performance parameters of each job (latency, CPU usage, memory usage, throughput, storage wait time, number of input/output operations, and the like).

In some embodiments the jobs may be part of a map-reduce approach such as a Hadoop or other similar "big data" process. However, any application or approach to organizing and executing related jobs may be visualized according to the methods described herein. Jobs may be related as performing parts of a single process, i.e. returning results that are inputs to a parent process, or may simply be related due to execution on clusters 106a, 106b managed by a particular entity. This data may be reported by the computer systems 108a-108d of the clusters 106a, 106b or may be requested from such systems by the server system 102.

The job data from the database 104 may be accessed according to methods described herein on one or more other computer systems, such as a workstation 110 or display device in data communication with the server system 102 by means of a local area network (LAN) or other network. Job data may also be accessed by other devices such as a mobile device 112 (e.g. tablet computer, smart phone, wearable computing device, and the like) or remote workstation 114 operatively coupled to the server system 102 by a network 116, such as the Internet 116, wide area network (WAN), or some other network.

Figure 2:
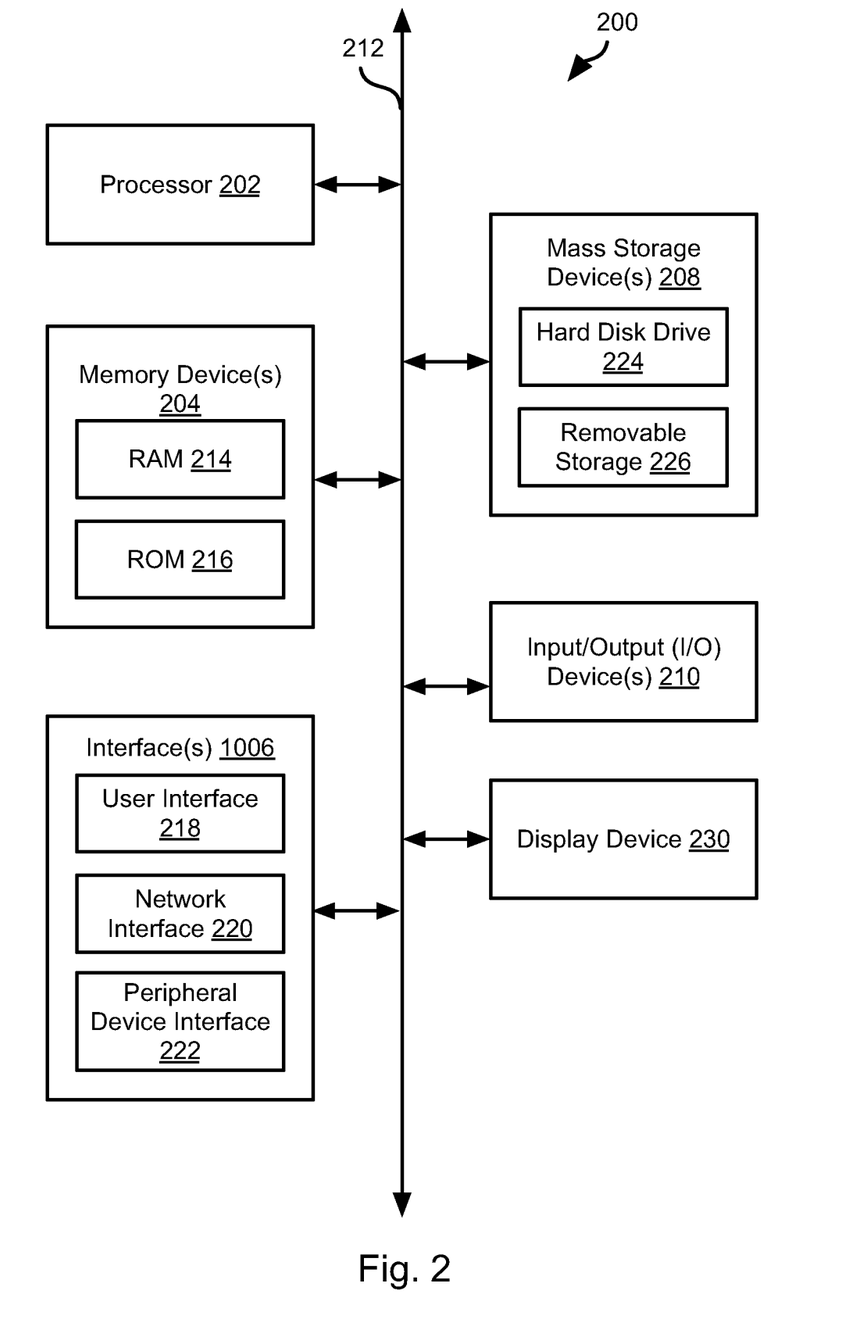
FIG. 2 is a schematic block diagram of a computer system suitable for implementing methods in accordance with an embodiment of the present invention.

FIG. 2 is a block diagram illustrating an example computing device 200. Computing device 200 may be used to perform various procedures, such as those discussed herein. A server system 102, computer system 108a-108d, workstation 110, mobile device 112, and workstation 114 may each have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
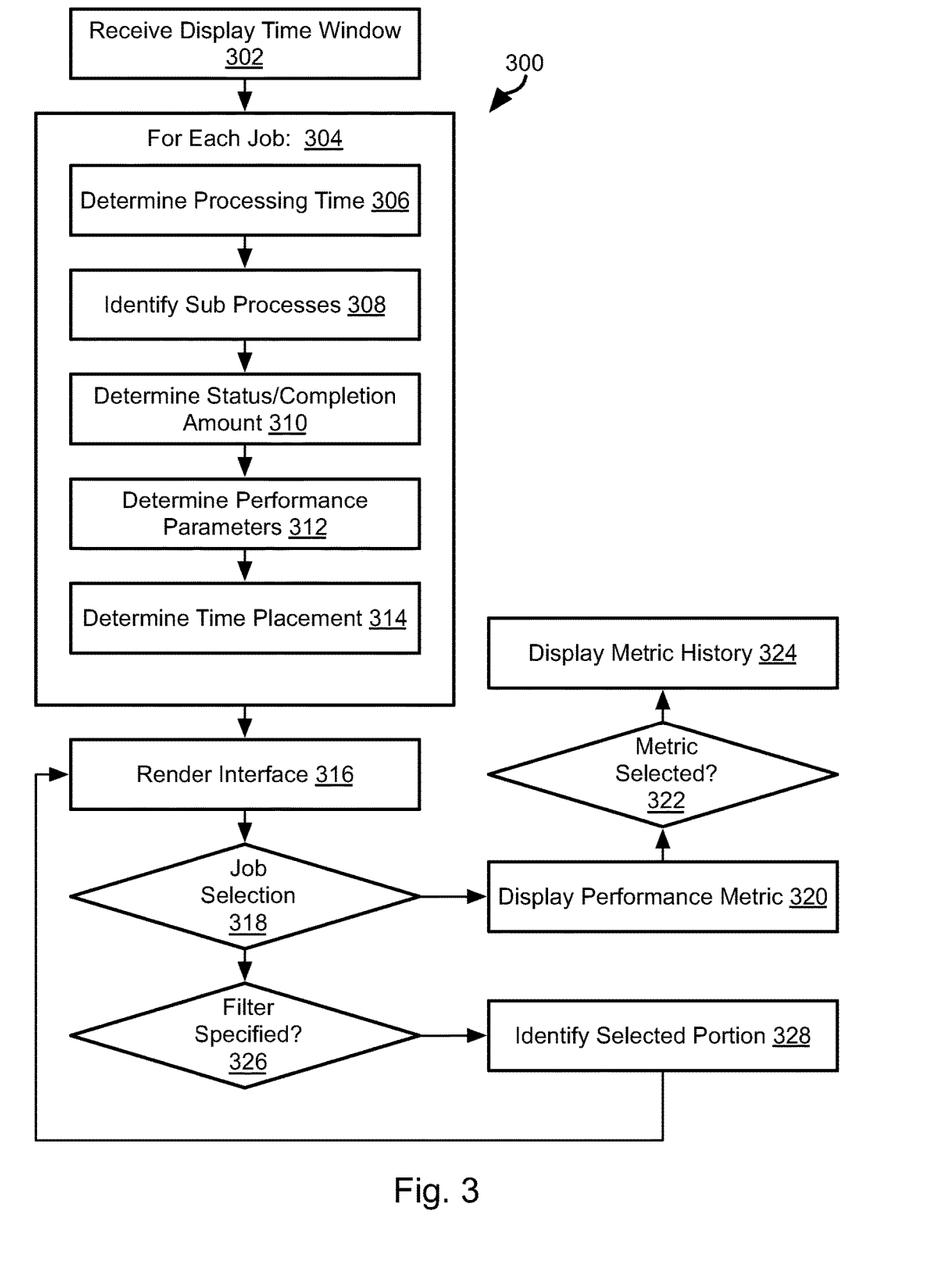
FIG. 3 is process flow diagram of a method for representing a plurality of jobs in accordance with an embodiment of the present invention.

FIG. 3 illustrates a method 300 for generating an interface. The method 300 may be executed by the server system 102 with the interface being displayed on, and inputs received from, a remote computer system 110-114. Accordingly, some or all of the steps of the method 300 may be executed on the server system 102 or by the remote computer system 110, 112, 114 on which the interface is displayed and from which inputs are received.

The method 300 may include receiving 302 or determining a display window for which job data is to be displayed. For example, a default time window preceding a current time may be determined to be the time window. Alternatively, the time window may be received from a user by way of an interface on a remote computer system 110-114.

The method 300 may include performing 304 for each job of a plurality of jobs, steps 306-314. The set of jobs with respect to which steps 306-314 are performed 304 may be all jobs for which job data exists, all jobs that a user invoking the method 300 has privileges to view, or jobs determined according to some selection criteria specified by a user. The plurality of jobs for which steps 306-314 are performed 304 may be limited to those having some portion of the execution thereof occurring within the time window determined at step 302.

At step 304 the processing time of the each job may be determined, e.g. the total time for which the job has been processed by a processor. The total processing time may include or exclude periods of time in which the job was suspended or otherwise paused. Where a job is currently executing, the processing time may be the duration of time between the current time (e.g. the time at which the method 300 was started or some other point of time during execution of the method 300) and the start time of the job.

The method 300 may include identifying 308 one or more sub-processes 308. For example, a job may spawn one or more sub-jobs, such as for execution in one or more separate threads. The relationship between the jobs and sub jobs may be determined from system calls made by the job or by analyzing a script that invokes creating of the jobs. The relationship between a job and its sub-jobs may be specified according to any scripting or programming or other job definition language or system known in the art. In some embodiments, sub jobs may be grouped together according to a relationship therebetween even though there is no parent job that spawned the sub-jobs. Again, the relationships used to determine that jobs are to be grouped as a collection of sub-jobs may be determined from system calls or computer instructions that invoked the sub-jobs. The identity and/or number of sub-jobs may be recorded in the job database 104 prior to execution of the method 300.

The method 300 may include determining one or both of a status and a completion amount. For example, a job may have a status of completed and therefore have a completion amount of 100%. A job may have a status of running, stopped, or failed and have a completion amount of less than 100% that indicates how much of the job has completed as of the current time or had completed at the time execution of the job was stopped. A running job may be a job that is currently executing on at least one computer system or at least one sub job thereof is running. A failed job may be a job that is no longer executing due to a fault and that did not complete successfully. A stopped job may be a job for which execution was stopped either permanently or temporarily (e.g. suspended) in response to an instruction to do so. A stopped job may be resumed in response to a user instruction. The job status and/or completion amount may be determined from the job database 104.

The method 300 may include for each job determining 312 one or more performance parameters for the each job, such as latency, CPU usage, memory usage, throughput, storage wait time, number of input/output operations, and the like. The performance parameters may be accessed form the job database 104. The performance parameters may be further processed to determine one or more representative values, such as a peak value, average value, minimum value, most recent value, average of two or more most recent values (e.g. local average), or some other value computed by a windowing function applied to values for the performance parameter. The values used to determine the representative value may be values for the performance parameter measured for the time range in which the job has executed.

The method 300 may further include determining 314 a time placement for graphical representations of each job. For example, let the time window be from T1 to T2 and the job have a start time Ts and an end time (or the current time if still executing). Where both Ts and Te are between T1 and T2, the placement time Tp on an axis representing time may be chosen to be the average time: (Ts+Te)/2. If Ts is outside of the time window T1 to T2, the placement time Tp may be selected to be T1. If Te is outside of the time window, the placement time Tp may be selected to be T2.

The method 300 may include using the information as determined according to steps 306-314 to render 316 a graphical representation of the plurality of jobs, such as the interface shown in FIG. 4 and discussed below. The method 300 may further include receiving interaction with the interface. For example, upon determining 318 that a user has selected a graphical representation of a job, then a window displaying some or all of the performance metrics for the selected job may be displayed. In response to determining 322 that a specific metric has been selected, additional information for the selected metric may be displayed 324, such as both the current value for the selected metric as well as some or all of an average value, a plot of historical values for a time window preceding a current time or some other time, and other statistical values based on historical values for the selected parameter.

The method 300 may include determining 326 that a user has specified a filter 326. For example, filter criteria may include jobs of a certain type, jobs of a certain status, jobs of a specified completion percentage, jobs belonging to a particular user or group of users, or any other criteria. In response to receiving an instruction to filter the jobs, a portion of the jobs meeting the filter criteria may be identified 328 and the interface may again be rendered 316 such that only the selected portion are displayed.

Figure 4:
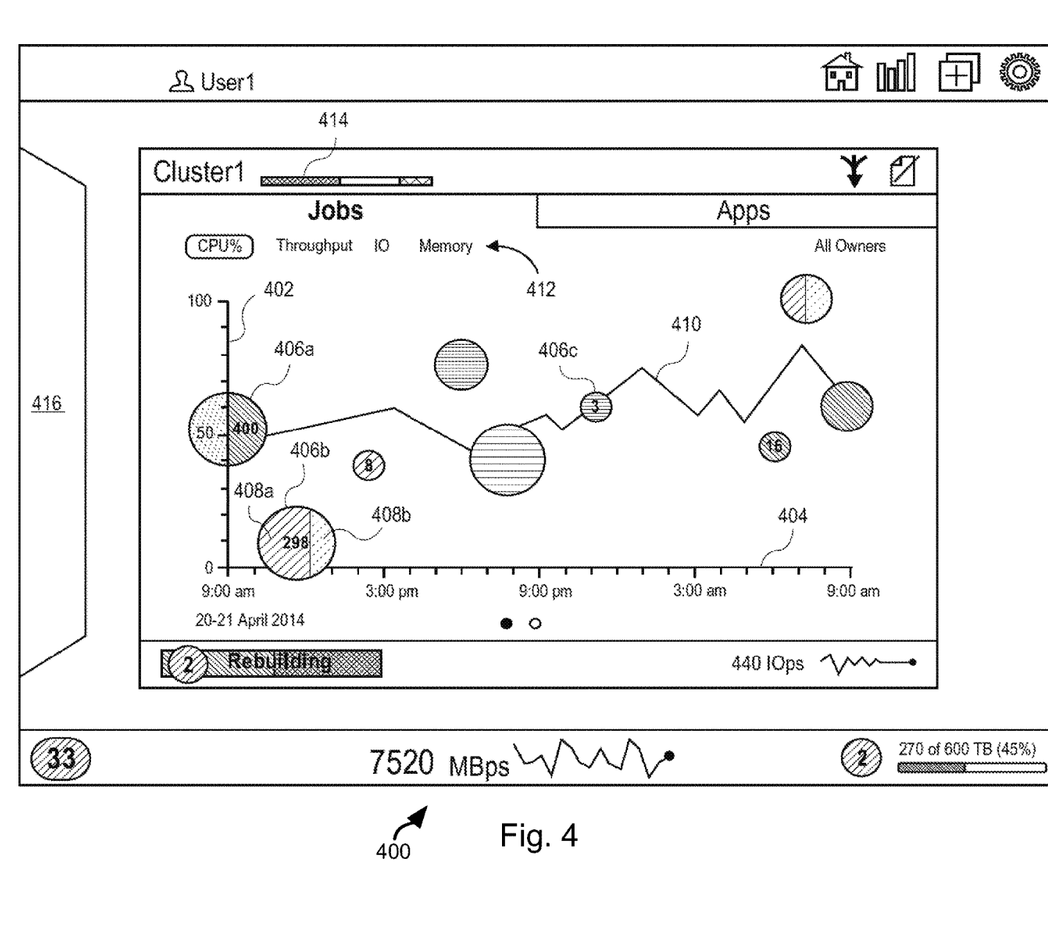
FIG. 4 is an example interface for representing a plurality of jobs in accordance with an embodiment of the present invention.

Referring to FIG. 4, a graphical representation 400 of the plurality of jobs may be as shown. Graphical representations of jobs may be placed in positioned of a graph defined by one axis 402 corresponding to a performance parameter and a second, perpendicular axis 404 corresponding to time. The range of values represented by each axis may be determined by default or specified by a user. The range of values may also be adjusted by a user. For example, the time axis 404 may extend from T1 to T2 of a time window determined as discussed above. The performance axis 404 may include a range of values including all values of jobs to be displayed in the interface 400. The range of values represented by either axis 402, 404 may be adjusted by a user. For example, where the interface 400 is displayed on a touchscreen device a user may touch two fingers to the screen and draw them together to increase the range of values for one or both axes 402, 404. A user may touch two fingers to the screen and spread them apart to reduce the range of values represented by one or both axes 402, 404. Such zooming actions are well known in the art of touchscreen devices. A user may also instruct the interface to switch the date and/or time range represented on the time axis, such as by switching to a future date and/or time range.

Each job may be represented by a graphical symbol 406a-406c, which are circular in the illustrated embodiment. Other shapes may also be used. Each graphical symbol 406a-406c may have a visual attribute that indicates the status thereof, for example, the different fill patterns of FIG. 4 may each correspond to a different status (running, stopped, failed, completed, etc.). In some embodiments, different colors may be used for each status such that the color of a graphical symbol 406a-406c indicates the status thereof. A different visual attribute of each graphical symbol 406a-406c may indicate the amount of processing time for the job corresponding to the graphical symbol. In the illustrated embodiment, the visual attribute of size is used to indicate the amount of processing time such that the bigger the graphical symbol 406a-406c, the longer the processing time. The size may be a function of processing time, e.g. the area may be proportional to processing time, the radius of circular symbols may be proportional to processing time, or the like. In some embodiments, the size of the graphical symbols 406a-406c may be a non-linear function of processing time, e.g. any polynomial, trigonometric, exponential, or combination of such functions taking the processing time as an input. In some embodiments, a fixed number of sizes may be used to represent processing time, each size representing a range of possible processing times. Accordingly, the size of graphical symbol 406a-406c may be selected as the size having a corresponding range including the processing time of the job represented by the graphical symbol 406a-406c.

As shown by the graphical symbol 406b, one portion 408a of the graphical symbol 406b may have a different attribute of another portion of the graphical symbol 408b. The relative sizes of the portions 408a, 408b may correspond to the completion amount of the job represented by the graphical symbol 406b. For example, one portion 408a may represent the percentage of the job completed and the other portion 408b may represent the percentage of the job that hasn't been completed. The portion 408a may have an area A1 that is X percent of the job that is completed. Alternatively, some other dimension of the graphical symbol 406b may be used to indicate completion percentage. For example, a relative size of the portion 408a in the horizontal or vertical direction to the size of the graphical symbol 406b in that direction may indicate the completion percentage of the job.

In some embodiments, the portions 408a, 408b are distinguished form one another by color. For example, the portions 408a, 408b may be different shades of the same color. If the graphical symbol 406b has a color of red, for example, to indicate that it is stopped then the portions 408a, 408b may be different shades of red. Likewise, if the graphical symbol 406b is green to indicate that it is running, then the portions 408a, 408b may be different shades of green. Alternatively, the portions 408a, 408b may be visually distinguishable from one another due to fill pattern (cross hatching, stipple pattern, or other pattern).

Where job is determined to have two or more sub-jobs, then the number of sub jobs may be indicated on the graphical symbol 406a-406c corresponding to the job. For example, graphical symbol 406b has imposed thereon the number of "298" and graphical symbol 406c has the number "3" imposed thereon.

The placement of the center, or some other point, of each graphical symbol 406a-406c along the time axis 404 may correspond to the placement time Tp as determined at step 314 of the method 300. Where Tp is the same as T1 or T2, the center of the graphical symbol may be placed on the left or right edge of the plot, such as shown by the placement of graphical symbol 406a. The position of the center, or some other point, of each graphical symbol 406a-406c along the performance parameter axis 402 may correspond to the value for the performance parameter as determined at step 312 of the method 300. Various performance parameters may be measured for each job. Accordingly, the parameter axis 402 may correspond to one of these, such as a default performance parameter or a performance parameter selected by a user. An aggregate value for the performance parameter may be plotted on the interface 400, as shown by line 410. Line 410 may correspond to a value of the performance parameter across all jobs being displayed in the interface 400 or the value of the performance parameter for the cluster or individual computing system for which corresponding jobs are being represented in the interface 400.

In some embodiments, interface elements 412 may be displayed on the interface 400. As shown, the interface elements 412 correspond to a plurality of performance parameters, such as CPU usage percentage, throughput, input/output operations, memory usage, or the like. Upon selection of one of these elements 412, the performance parameter axis 402 may be set to indicate a range of values for the corresponding performance parameter (the "selected performance parameter"), the positions of the graphical symbols 406a-406c along the axis 402 may be set according to the values of the selected performance parameter for the jobs corresponding to the graphical symbols 406a-406c. Likewise, the line 410 may be changed to indicate the time varying value of the selected performance parameter for the aggregate jobs or host cluster.

Various other metrics of the status or performance of the cluster for which jobs are represented in the interface 400 may also be displayed, such as the amount of memory used, the amount of storage used, one or more aggregate performance parameters for the cluster (i.e. some or all of the performance parameters for jobs as outlined above), or other values. In some embodiments, an indictor 414 may indicate the types of storage used by the cluster. For example, the illustrated bar may include portions of different colors or fill patterns with the width of each portion indication a percentage of storage of a given type being used by the cluster. For example, one color (e.g. gold) may indicate a proportion of local hard drive storage, another color (e.g. silver) may indicate a proportion of storage on network connected storage devices, and another color (e.g. bronze) may indicate a proportion of storage on a remote device (e.g. cloud storage).

As discussed in greater detail below, display of the interface 400 may be invoked within an interface displaying graphical representations of a plurality of clusters. Accordingly, in some embodiments, a portion 416 of another cluster may be displayed adjacent the interface 400. The portion 416 may be selectable in order to invoke display of an interface 400 of another cluster. Likewise, a user may zoom out from the interface 400 in order to view an interface displaying representations of a plurality of clusters by selecting an area outside of the interface 400 or some other interface element.

Figure 5:
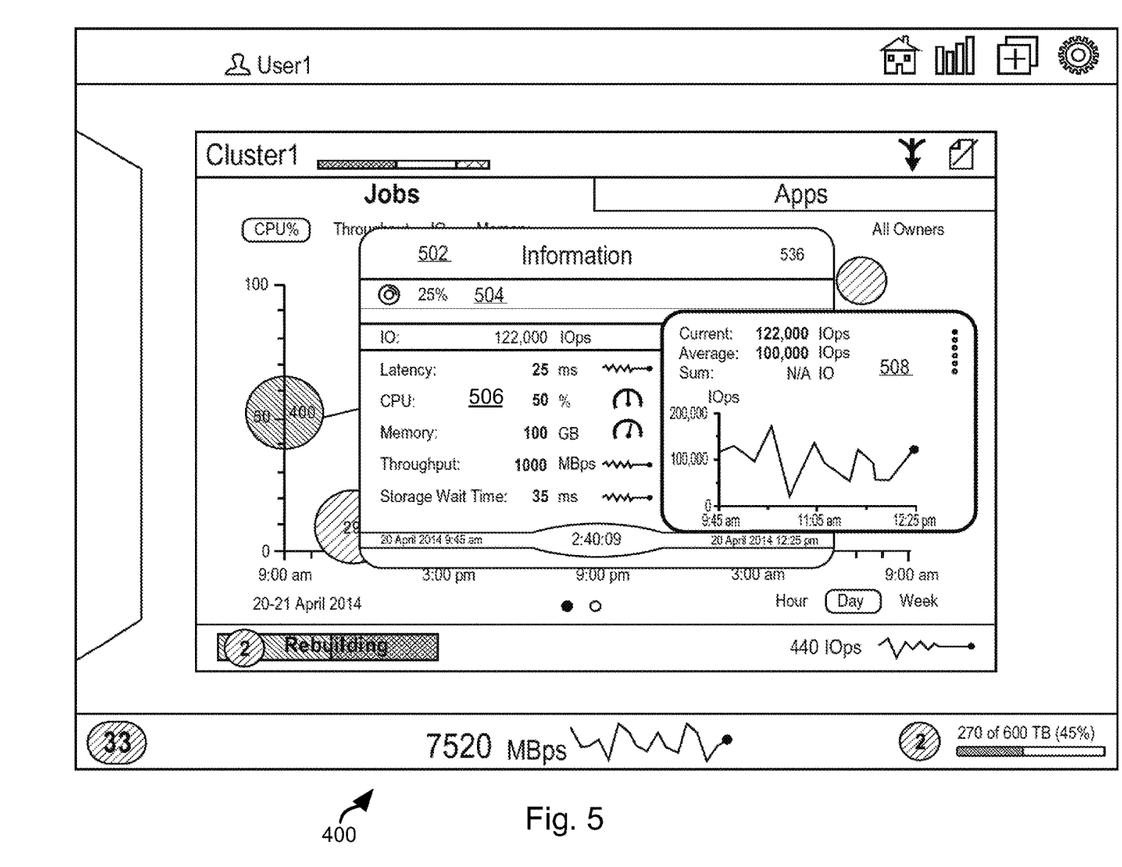
FIG. 5 is another example interface for representing a plurality of jobs in accordance with an embodiment of the present invention.

Referring to FIG. 5, in some embodiments, the interface 400 may be operable to enable a user to select a graphical symbol 406a-406c in order to invoke display of additional information regarding a particular job. For example, upon tapping, clicking, or otherwise selecting graphical symbol 406b, the illustrated interface 502 may be displayed. The interface 502 may include representations such as a percentage completed 504, and performance parameter values 506, such as latency, CPU usage, memory usage, throughput, storage wait time, start time, current time, and end time (if any).

In some embodiments, the interface 502 may be programmed such that upon selection of a performance parameter 506, a window 508 is displayed that includes additional information for the performance parameter 506, such as historical values or statistical values based on the historical values. For example, as shown the window 508 includes a current value, average value, a sum (e.g. integral of the value over time), and a plot of the value for the performance parameter over a time window.

Figure 6:
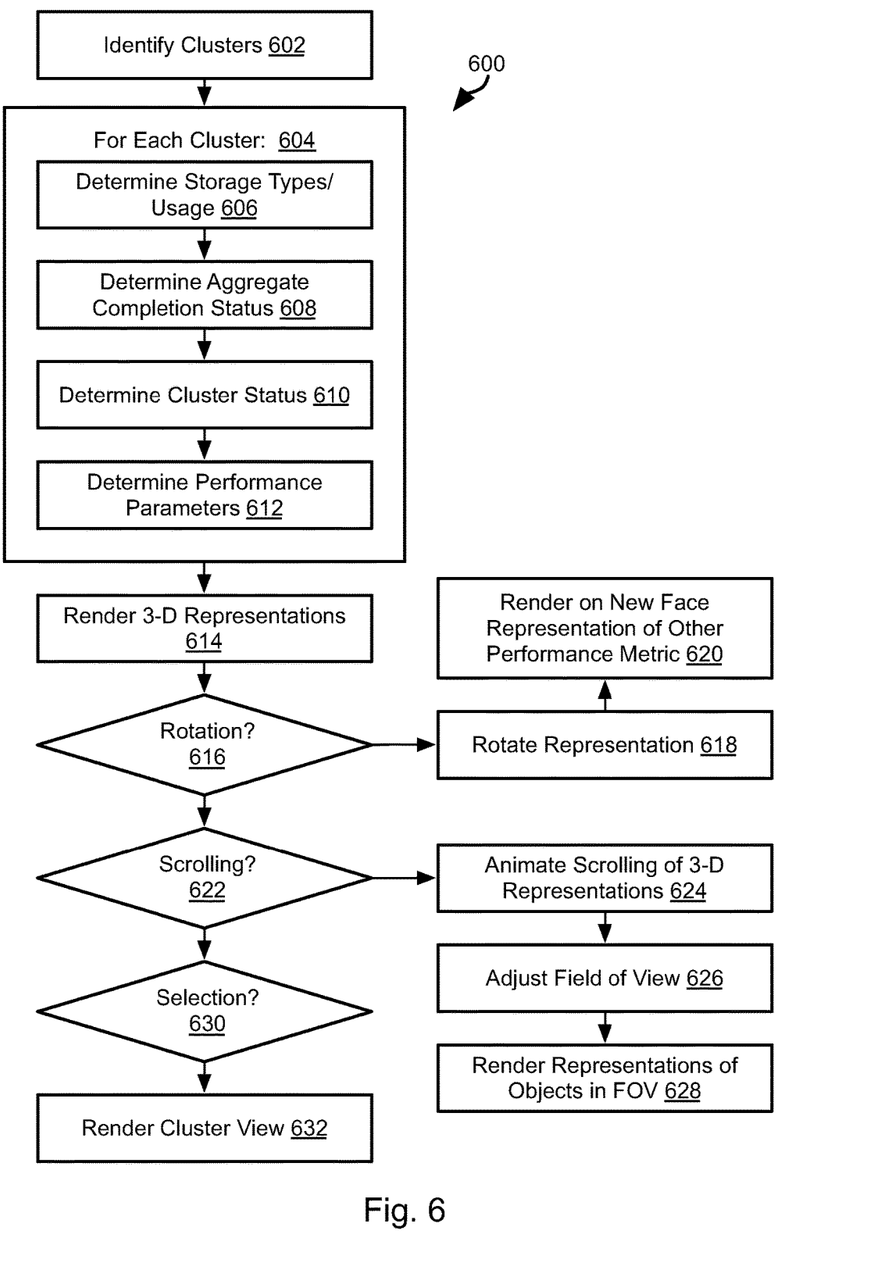
FIG. 6 is a process flow diagram of a method for representing computing clusters in accordance with an embodiment of the present invention.

FIG. 6 illustrates a method 600 for providing a graphical representation and interface for a plurality of clusters. The method 600 may also be used to represent other groups of jobs. For example, rather than be grouped according to the cluster on which they execute, jobs may be clustered together according to some other structure, such as according to a hierarchical relationship such that each graphical symbol of an interface represents a node at a given level of the hierarchy and represents one or more descendent nodes in the hierarchy, where each node is either a job or a cluster of jobs. Accordingly, for the following description of the method 600, clusters may refer to computer clusters and the corresponding jobs executing thereon or clusters of jobs organized according to some other distinguishing criteria.

The method 600 may be executed by the server system 102 with the interface being displayed on, and inputs received from, a remote computer system 110-114. Accordingly, some or all of the steps of the method 600 may be executed on the server system 102 or by the remote computer system 110, 112, 114 on which the interface is displayed and from which inputs are received.

The method 600 may include identifying 602 a plurality of clusters, such as according to records describing such clusters as stored in the job database 104. For some or all of the clusters, steps 606-612 may be performed 604. Step 606 may include determining the storage types and usage of each type by the cluster. For example, as noted above various types of storage may be used such as a local hard drive, storage on a local network, and cloud-based storage. Accordingly, the amount of each type of storage for the cluster may be determined 606.

At step 608, an aggregate completion status for the cluster is determined 608. For example, if N jobs are executing on the cluster and X(i) is the completion percentage of job i, i=1 to N, then the aggregate completion status may be a function of the vector of completion percentages X, such as an average thereof or a weighted average with each completion percentage X(i) weighted according to a size of the job i to which it corresponds. The completion status for the cluster may be retrieved from the job database 104.

At step 610 a cluster status 610 is determined for example, the status may indicate whether the cluster is online, offline, unavailable, stopping, or some other status. The status may be any possible status of a cluster according to any clustering approach known in the art. Again, the status may be retrieved from the job database 104.

At step 612 one or more performance parameters are obtained for the cluster. Again, the performance parameters may be an aggregate (e.g. sum) of performance parameters for the individual jobs executing on the cluster, such as the performance parameters described hereinabove. The performance parameters determined 612 may include other performance parameters of individual computer systems of the cluster.

The method 600 may further include rendering 614 graphical representations of a portion of the clusters. For example, a field of view may be sized such that not all clusters may be graphically represented. Accordingly, a field of view (FOV) may be determined and a portion of the clusters selected. For example, clusters may be arranged alphabetically or numerically by name, by size, by performance, or some other criteria. A portion of the arrangement of clusters may be selected as being within a FOV and graphical representations thereof may be rendered 614 in an interface. The graphical representation of a cluster may be a rendering of a three-dimensional object having multiple faces, such as a cube, tetrahedron, or some other three-dimensional object. Rendering 614 the three-dimensional representation may include displaying some of all of the information determined at steps 606-612, or some derivative thereof, on one of the faces of the three-dimensional representation.

The method 600 may further include receiving interactions with the interface. For example, if an instruction to rotate a graphical representation is found 616 to have been received, then the three-dimensional representation may be rotate 618 such that a different face of the three-dimensional representation is facing a viewer and on the different face of the three-dimensional representation, different information may be displayed 620 on the different face. For example, in the original rendering one performance parameter, or derivative thereof, on an original face. Upon rotation, a different performance parameter or derivative thereof, is displayed on the different face. The rotation instruction 616 may be received by any means, such as a horizontal swiping motion, selection of an interface element invoking rotation, or some other means.

If a scrolling instruction is found 622 to have been received, then animated scrolling of the three-dimensional representations may be performed showing sliding of a field of view with respect to the collection of three-dimensional representations such that a different (possibly overlapping) set of graphical representations is visible within a FOV of the interface. The field of view may be adjusted 626 and graphical representation of clusters in the new field of view may be rendered 628, which may include displaying some or all of the information noted above with respect to step 614.

The method 600 may further include receiving 630 a selection of a three-dimensional graphical representation and, in response, rendering 632 a view of the cluster. Rendering a view of the cluster may include performing some or all of the steps of the method 300 and displaying the interface 400 of one or both of FIGS. 4 and 5.

Figure 7:
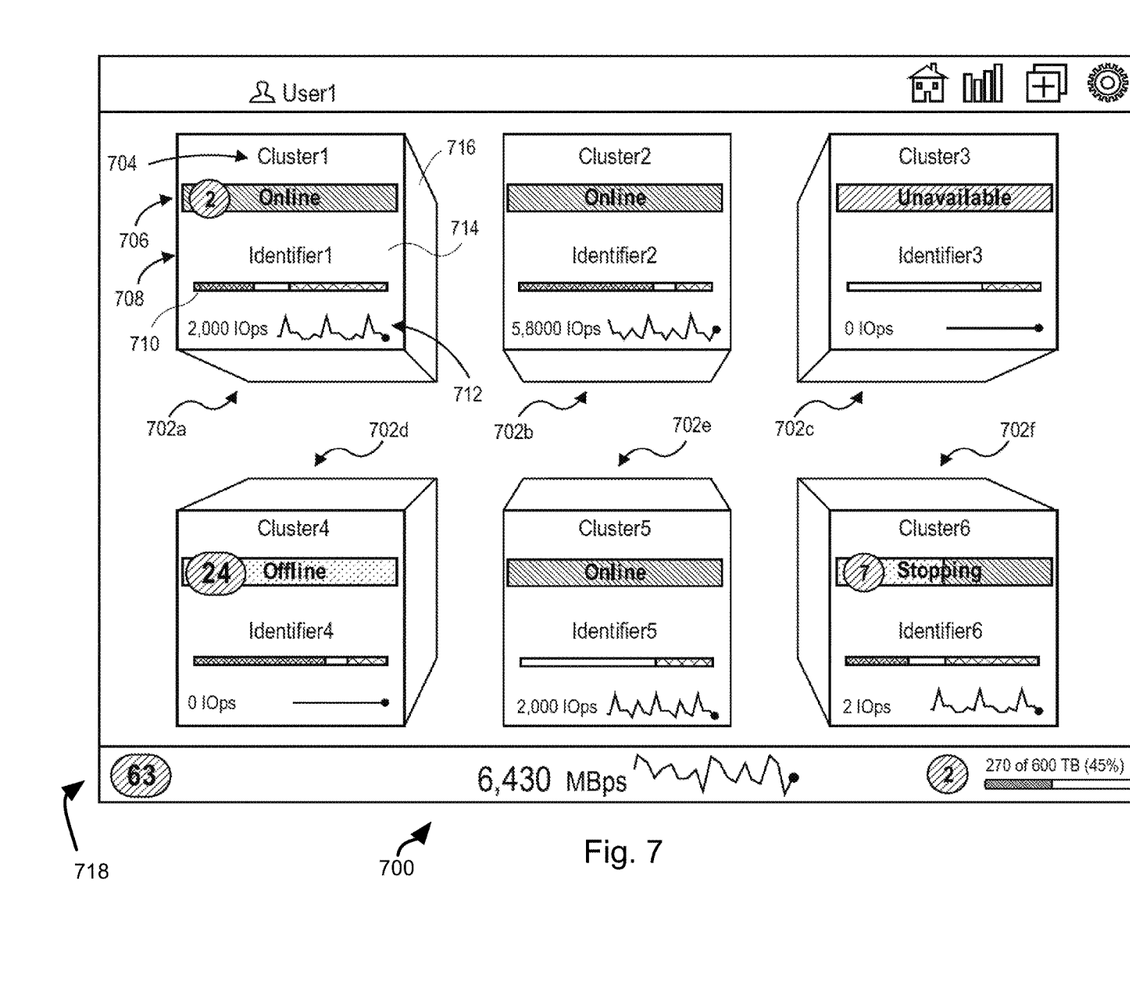
FIG. 7 is an example interface for representing computing clusters in accordance with an embodiment of the present invention.

FIG. 7 illustrates an example interface that may be displayed and receive interactions in accordance with the method 600. As described above, a plurality of renderings 702*a*-702*f* of three-dimensional objects are displayed within a FOV. The renderings 702*a*-702*f* are cubes in the illustrated embodiment. On a face of each rendering 702*a*-702*f* are displayed one or more attributes of the cluster represented by the rendering 702*a*-702*f*. For example, element 704 may be a name of the cluster, element 706 may list a status of the cluster, which may include one or both of text and a color indicating the status. As is apparent in FIG. 7, a number may be included in element 706, the number may represent notifications from the jobs executing on the cluster. For example, a job may generate error messages or other notifications. The number included on element 706 may indicate that such a message or other notification is available fore viewing. Upon detecting a user selection of the number (e.g. by detecting tapping or clicking), these messages may be displayed on the interface 400 or presented in a browser for invoking viewing of messages. Element 708 may list an identifier of an individual, department, or other entity that operates the cluster or on whose behalf jobs are executed by the cluster represented by the rendering 702*a*-702*f*.

In some embodiments, element 710 may indicate the types of storage used by the cluster. For example, the illustrated bar may include portions of different colors or fill patterns with the width of each portion indication a percentage of storage of a given type being used by the cluster. For example, one color (e.g. gold) may indicate a proportion of local hard drive storage, another color (e.g. silver) may indicate a proportion of storage on network connected storage devices, and another color (e.g. bronze) may indicate a proportion of storage on a remote device (e.g. cloud storage). Upon receiving a user selection of element 710, more detailed information regarding storage may be displayed to the user, such as percentage of storage used belonging to each type and the percentage of each storage type used, i.e. percentage of available storage for each storage type.

Element 712 may indicate a performance parameter for the cluster (e.g. latency, CPU usage, memory usage, throughput, storage wait time, number of input/output operations, and the like). Element 712 may include a current value for the performance parameter as well as a plot of historical values of the performance parameter for some period preceding a current time.

In response to receiving an instruction to rotate a rendering 702*a*-702*d*, a different face 716 of the three-dimensional representation may be displayed in the rendering 702*a*-702*d*. Values for a different performance parameter may be displayed on the face 716. Other elements 704-710 may be replaced with other information regarding the cluster. For example, each face of the three-dimensional representation may have associated therewith a different combination of information regarding a cluster. Accordingly, the rendering of the three-dimensional representation when a face is toward the viewer may include that combination of information corresponding to that face.

User interface elements 718 positioned at a bottom or top of the interface 700 may illustrate information regarding the overall status of the cluster. For example, the number "63" may indicate a total number of error messages generated by the clusters viewed in the interface 700. The interface 700 may receive selection of the number and, in response, invoke display of the messages or a browser for viewing the messages. Interface elements 718 may further display current and/or historical values for aggregate (e.g. summed or averaged) performance parameters for the clusters viewed in the interface 700.

Figure 8:
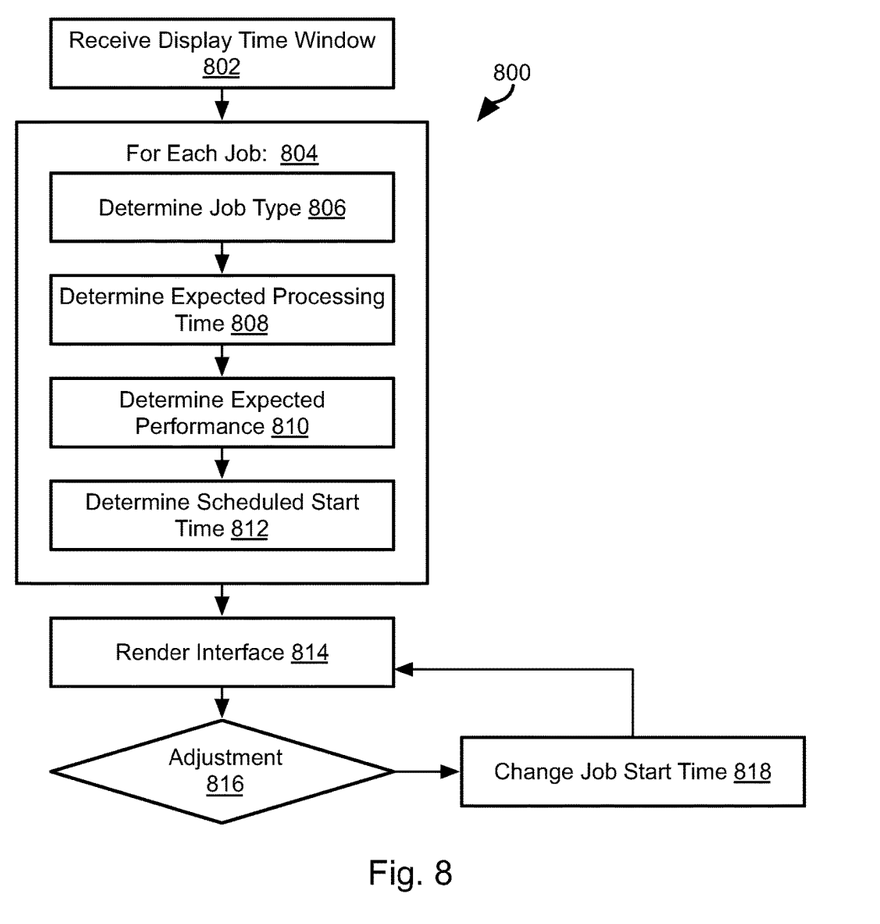
FIG. 8 is a process flow diagram of a method for representing scheduled jobs in accordance with an embodiment of the present invention.

FIG. 8 illustrates a method 800 for generating an interface for future jobs. The method 800 may be executed by the server system 102 with the interface being displayed on, and inputs received from, a remote computer system 110-114. Accordingly, some or all of the steps of the method 800 may be executed on the server system 102 or by the remote computer system 110, 112, 114 on which the interface is displayed and from which inputs are received.

The method may include receiving 802 a display time window. At least a portion of the received time window may include a future time following the current time of execution of the method 800. Receiving 802 the display window may include receiving an instruction within the interface 400 to display a window that includes a future time period, such as by scrolling along the time axis or selecting an interface element instructing display of jobs scheduled for a future period.

The method 800 may include performing 804 some or all of steps 806-814 for jobs scheduled to start within the time window. Step 806 may include determining a job type for the job. A job type may be determined based on the code or script that is executed when performing the job; the arguments, files, or other inputs to the job; or some other attribute of the job or instructions that invoke execution of the job.

At step 808 the expected processing time for the job may be determined. For example, the job database 104 may store completion times or an average completion time measured for jobs of the same type. This value may then be used as the expected processing time for the job.

At step 810 one or more expected performance parameters may be determined. For example, the job database 104 may store performance parameters or an average performance parameter measured for jobs of the same type. For example, during the processing time of a prior job values for one or more parameters may be sample sampled periodically and averaged. The average of the average values for a plurality of jobs of the determined 806 job type may then be used as the expected value for the performance parameter. The average of average values for the plurality of prior jobs of the same type may be computed for various performance parameters, such as some or all of the performance parameters outlined above. At step 812 the scheduled start time for the job may be determined, such as form a script or other computer instructions that invoke execution of the job.

An interface including visual representation of the scheduled jobs may then be rendered 814 and displayed on a display device. In some embodiments, the interface may receive inputs from a user moving a graphical representation of a job, such as by detecting dragging of the job. In response to determining 816 that such an adjustment has been received, the start time of the job corresponding to the adjusted graphical representation, such as to be equal to the time indicated by the interface at the point to the graphical representation was moved.

Figure 9:
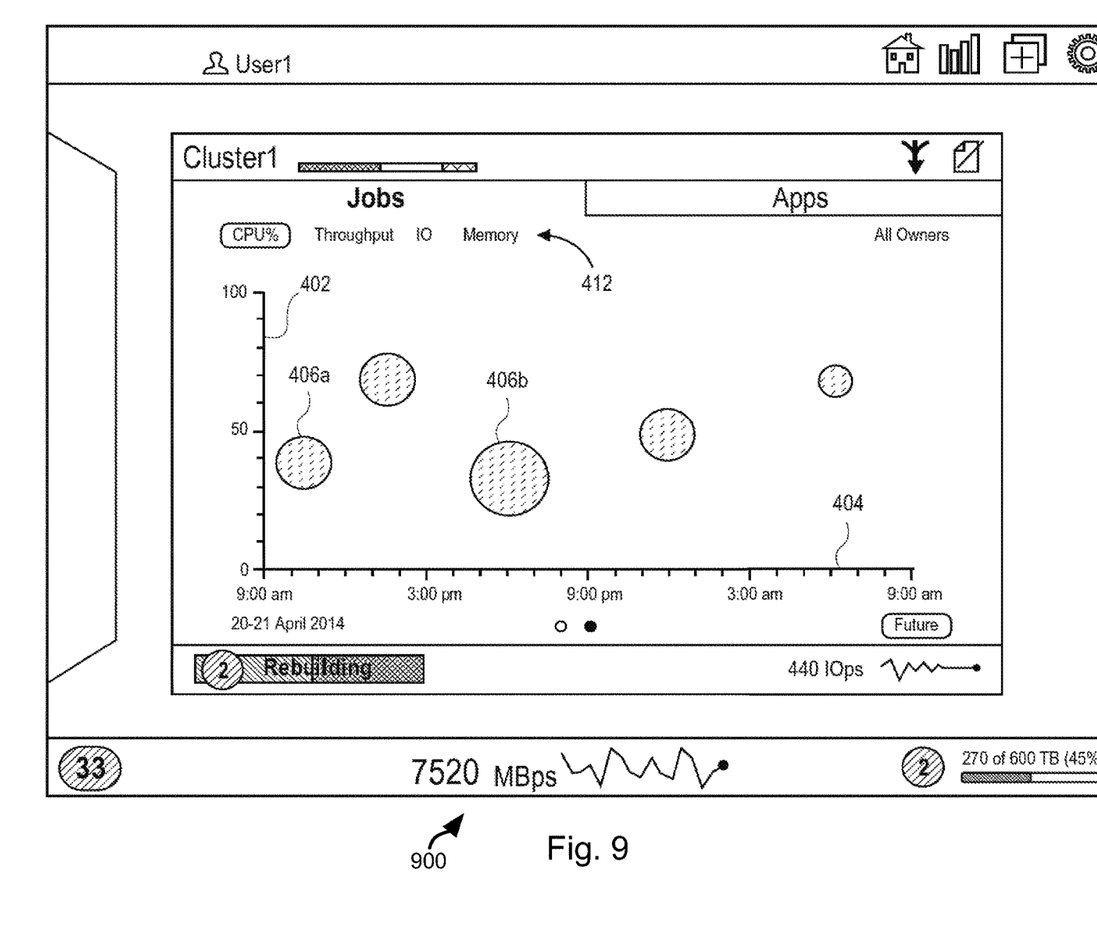
FIG. 9 is an example interface for representing scheduled jobs in accordance with an embodiment of the present invention.

FIG. 9 illustrates an example interface 900 that may be displayed as a result of execution of the method 800. As for the interface 400, the interface 800 may include a first axis 402 indicating a performance parameter and a second axis perpendicular to the first parameter and indicating time. Graphical representations 406*a*-406*b* of scheduled jobs may be rendered in the same manner as for the interface 400 except that the location of the center, or some other point, of the graphical representations 406*a*-406*b* may indicate a scheduled start time rather than be a function of one or more of a start time, end time, or current time as described above with respect to the interface 400. The size of each graphical representation 406a-406b may also instead indicate the expected processing time for the type of job of the job corresponding to the graphical representation 406a-406b as determined according to the method 800. Similarly, the position along the axis 402 may indicate an expected performance value as determined according to the method 800. As for the interface 400, interface elements 412 may receive a selection of a performance parameter from a user. In response, the axis 402 and positions of the representations 406a-406b along the axis 402 may be adjusted to indicate the expected value for the selected performance parameter.

Adjustment of the scheduled start time for a job corresponding to a representation 406a-406b may be accomplished by a user selecting the graphical representation 406a-406b and dragging it to a different position along the axis 404. The new position of the center, or some other point on the graphical representation 406a-406b, along the axis 404 may then be set to be the new start time of the corresponding job.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   receiving, on a computer system, a plurality of descriptors of a computational process each including a plurality of attributes;
   for each descriptor of at least a portion of the plurality of descriptors, transmitting, by the computer system to a display device, a rendering of a three-dimensional object having on a first face thereof a first portion of the plurality of attributes of the each descriptor, the first face being viewable;
   receiving, by the computer system, an instruction to rotate the three-dimensional object;
   in response to receiving the instruction to rotate the three-dimensional object, transmitting, by the computer system to the display device, a rendering of the three-dimensional object having on a second face thereof a second portion of the plurality of attributes of the each descriptor, the second face being viewable;
   receiving, by the computer system, a selection of the rendering of the three-dimensional object corresponding to a descriptor of the plurality of descriptors, wherein the descriptor is a status of a plurality of jobs executing on a cluster, each descriptor of the plurality of descriptors corresponding to a different cluster;
   in response to receiving the selection, transmitting to the display device a graphical representation of the plurality of jobs of the cluster corresponding to the descriptor such that, for each job of at least a portion of the plurality of jobs are represented by a graphical symbol, each graphical symbol for the each job—
   having a size indicating an amount of time the each job has one of been processing and was processed;
   having a color indicating a completion status of the each job;
   having a first position on a first axis indicating a first performance parameter for the each job;
   having a second position on a second axis perpendicular to the first axis, the second position corresponding to at least one of a start time of the each job, an end time of the each job, and a current time.

2. The method of claim 1, wherein the first portion includes attributes of the plurality of attributes not included in the second portion.

3. The method of claim 2, wherein the first portion and second portion include one or more of the same attributes of the plurality of attributes.

4. The method of claim 1, wherein the plurality of attributes of each descriptor include performance characteristics of the corresponding cluster.

5. The method of claim 1, further comprising rendering on the first face of the three-dimensional object for at least one descriptor a bar having two or more visually distinguishable portions, each portion representing a percentage of storage corresponding to one of a plurality of different types of storage used by the computational process corresponding to the at least one descriptor.

6. The method of claim 1, wherein the first performance parameter is one of memory usage, input/output operations, central processing unit (CPU) usage, and throughput.

7. The method of claim 6, further comprising:
   receiving, by the computer system, an instruction to switch from the first performance parameter to a second performance parameter;
   in response to receiving the instruction to switch, placing the graphical symbols of the plurality of jobs along the first axis in positions corresponding to values of the second performance parameters for the plurality of jobs.

8. The method of claim 7, further comprising visually displaying on each graphical symbol for each job a completion percentage of the each job.

9. The method of claim 7, further comprising visually displaying on each graphical symbol for each job a completion percentage of the each job by including in a first portion of the graphical symbol having a proportion corresponding to the completion percentage with a first fill attribute different from a second fill attribute of a second portion of the graphical symbol not including the first portion with a second fill attribute visually distinguishable from the first fill attribute.

10. The method of claim 1, wherein the three-dimensional object is a cube.

11. A computer system comprising one or more processors and one or more memory devices operably coupled to the one or more processors and storing executable and operational data effective to cause the one or more processors to:
    receive a plurality of descriptors of a computational process each including a plurality of attributes, wherein each descriptor of the plurality of descriptors is a status of a plurality of jobs executing on a cluster, each descriptor corresponding to a different cluster;
    for each descriptor of at least a portion of the plurality of descriptors, transmit to a display device, a rendering of a three-dimensional object having on a first face thereof a first portion of the plurality of attributes of the each descriptor, the first face being viewable;
    receive an instruction to rotate the three-dimensional object;
    in response to receiving the instruction to rotate the three-dimensional object, transmit, to the display device, a rendering of the three-dimensional object having on a second face thereof a second portion of the plurality of attributes of the each descriptor, the second face being viewable receive a selection of the rendering of the three-dimensional object corresponding to a descriptor of the plurality of descriptors;

in response to receiving the selection, output to the display device a graphical representation of the plurality of jobs of the cluster corresponding to the descriptor such that, for each job of at least a portion of the plurality of jobs are represented by a graphical symbol, each graphical symbol for the each job— having a size indicating an amount of time the each job has one of been processing and was processed;

having a color indicating a completion status of the each job;

having a first position on a first axis indicating a first performance parameter for the each job;

having a second position on a second axis perpendicular to the first axis, the second position corresponding to at least one of a start time of the each job, an end time of the each job, and a current time.

12. The system of claim 11, wherein the first portion includes attributes of the plurality of attributes not included in the second portion.

13. The system of claim 12, wherein the first portion and second portion include one or more of the same attributes of the plurality of attributes.

14. The system of claim 11, wherein the plurality of attributes of each descriptor include performance characteristics of the corresponding cluster.

15. The system of claim 14, wherein the performance characteristics include at least one of:

latency, central processing unit (CPU) usage, memory usage, throughput, storage wait time, and input/output operations.

16. The system of claim 11, wherein the first performance parameter is one of memory usage, input/output operations, central processing unit (CPU) usage, and throughput.

* * * * *